United States Patent
Wei et al.

(10) Patent No.: US 9,049,088 B2
(45) Date of Patent: Jun. 2, 2015

(54) CARRIER AND SAMPLING FREQUENCY OFFSETS ESTIMATION METHOD AND ASSOCIATED APPARATUS APPLIED TO MULTI-CARRIER COMMUNICATION SYSTEM

(71) Applicant: MStar Semiconductor, Inc., Hsinchu Hsien (TW)

(72) Inventors: Fong-Shih Wei, New Taipei (TW); Jen-Hsing Wang, New Taipei (TW)

(73) Assignee: MStar Semiconductor, Inc, Hsinchu Hsien (TW)

( * ) Notice: Subject to any disclaimer, the term of this patent is extended or adjusted under 35 U.S.C. 154(b) by 0 days.

(21) Appl. No.: 14/105,964

(22) Filed: Dec. 13, 2013

(65) Prior Publication Data
US 2014/0169508 A1    Jun. 19, 2014

(30) Foreign Application Priority Data
Dec. 17, 2012    (TW) .............................. 101147901 A (51) Int. Cl.
H04L 27/28    (2006.01)
H03H 7/40    (2006.01)
H04L 27/26    (2006.01)

(52) U.S. Cl.
CPC .................................. *H04L 27/265* (2013.01)

(58) Field of Classification Search
CPC ............. H04L 27/2647; H04L 5/0007; H04L 27/2657

USPC ................. 375/260, 267, 340, 344, 233, 295; 370/204, 206, 480
See application file for complete search history.

(56) References Cited

U.S. PATENT DOCUMENTS

| | | | |
|---|---|---|---|
| 2007/0147225 A1* | 6/2007 | Yu et al. .................... | 370/203 |
| 2009/0185646 A1* | 7/2009 | Jo ................................. | 375/343 |
| 2011/0002412 A1* | 1/2011 | Hou et al. .................... | 375/267 |

FOREIGN PATENT DOCUMENTS

TW    200931837    7/2009

OTHER PUBLICATIONS

Taiwan Patent Office, "Office Action", Jan. 21, 2015.

* cited by examiner

*Primary Examiner* — Khai Tran
(74) *Attorney, Agent, or Firm* — WPAT, PC; Justin King; Doug Hosack (57) ABSTRACT

An offset estimation apparatus for a multi-carrier communication system is provided. The offset estimation apparatus includes an FFT unit configured to transform a reception signal and to generate multiple symbols, a conjugate multiplier configured to receive and conjugate multiply two consecutive symbols corresponding to predetermined subcarrier indices to generate multiple correlating complex numbers, a powering unit configured to raise the correlating complex numbers by a received exponent to generate multiple powered correlating complex numbers, and a calculation unit configured to estimate a frequency offset according to the powered correlating complex numbers.

18 Claims, 4 Drawing Sheets

CARRIER AND SAMPLING FREQUENCY OFFSETS ESTIMATION METHOD AND ASSOCIATED APPARATUS APPLIED TO MULTI-CARRIER COMMUNICATION SYSTEM

This application claims the benefit of Taiwan application Serial No. 101147901, filed Dec. 17, 2012, the subject matter of which is incorporated herein by reference.

BACKGROUND OF THE INVENTION

1. Field of the Invention

The invention relates in general to a frequency offset estimation method and associated apparatus for a multi-carrier communication system, and more particularly, to a carrier and sampling frequency offsets estimation method and associated apparatus for a Digital Video Broadcasting Terrestrial (DVB-T) and Integrated Services Digital Broadcasting (ISDB-T) system.

2. Description of the Related Art

A multi-carrier communication system, such as a system based on the orthogonal frequency division multiplexing (OFDM) technology, has long been available. The OFDM technology is applicable to DVB-T systems and ISDB-T systems. In general, the OFDM technology is extremely sensitive to frequency offsets. When a mismatch between oscillators of a transmitter and a receiver exists, frequency offsets are incurred. Those frequency offsets include a carrier frequency offset (CFO) and a sampling frequency offset (SFO).

Therefore, there is a need for a solution for estimating the carrier frequency offset and the sampling frequency offset for a DVB-T system and an ISDB-T system.

SUMMARY OF THE INVENTION

The invention is directed to a carrier frequency offset and sampling offset estimation method and associated apparatus for a DVB-T system and an ISDB-T system.

A frequency offset estimation apparatus for a multi-carrier communication system is provided by the present invention. The apparatus includes: a fast Fourier transform (FFT) unit, configured to transform a reception signal from a time domain to a frequency domain, and generate a plurality of samples corresponding to a plurality of symbols; a conjugate multiplier, configured to generate a plurality of correlating complex numbers by conjugate multiplying the samples corresponding to two consecutive symbols corresponding to a plurality of predetermined subcarrier indices; a powering unit, configured to receive and apply an exponent to the correlating complex numbers to generate a plurality of powered correlating complex numbers; and a calculation unit, configured to receive the powered correlating complex numbers and accordingly estimate a frequency offset.

A frequency offset estimation method for a multi-carrier communication system is provided by the present invention. The method includes: calculating a plurality of correlating complex numbers of a plurality of samples corresponding to two consecutive symbols corresponding to a plurality of predetermined subcarrier indices; applying an exponent to the correlating complex numbers according to a power to generate a plurality of powered correlating complex numbers; and estimating a frequency shift according to the powered correlating complex numbers.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
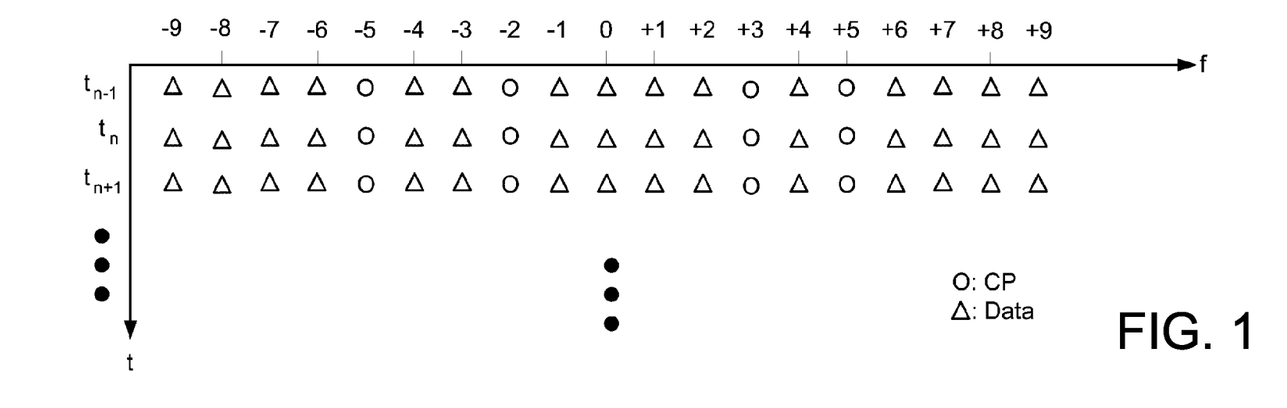
FIG. 1 is a schematic diagram of an OFDM symbol in a DVB-T system.

FIG. 1 shows a schematic diagram of OFDM symbols in a DVB-T system. OFDM is a multi-carrier modulation method. In OFDM modulation, data are distributed to many orthogonal subcarriers having different frequencies, so that each of the subcarriers may transfer the data in a lower transmission bit rate. Taking a receiver for example, an OFDM modulated reception signal is FFT transformed from a time domain to a frequency domain. The transformed OFDM modulated reception signal is then spread as a plurality of sample points, forming OFDM symbols, each spread along different subcarriers at a same time point. As shown in FIG. 1, OFDM symbols are received at the time points, $t_{n-1}$, $t_n$ and $t_{n+1}$, respectively.

In the embodiment, each of the OFDM symbol includes 19 subcarriers, which are represented as $-9\sim-1$, 0, $+1\sim+9$ subcarrier indices on the frequency axis (f) in FIG. 1. A center frequency of the OFDM symbol is set as the subcarrier index 0. Each subcarrier at a fixed interval toward an increasing direction is defined as a positive subcarrier index, and each subcarrier at a fixed interval toward a decreasing direction is defined as a negative subcarrier index.

In a DVB-T system, it is specified that a continual pilot (CP) signal needs to be arranged on a predetermined subcarrier. The CP signal is a predetermined time-invariant real number appearing at a fixed subcarrier frequency, and is for estimating a carrier frequency offset (CFO). As seen from FIG. 1, the CP signal appears at the subcarriers $-5$, $-2$, $+3$ and $+5$, whereas data signals are present at other subcarriers. In the DVB-T standard, it is also specified that the number of CP signals at positive subcarrier indices is equal to the number of CP signals at negative subcarrier indices. It should be noted that the above locations of the CP signal are given as an example, and the CP signal may be arranged at other subcarrier indices. Further, the total number of subcarriers of each OFDM symbol is not limited to the exemplary number 19 in the embodiment.

When a carrier frequency offset occurs in a DVB-T system, the same subcarrier frequency offset also occurs at all the subcarriers. For example, assuming that a theoretical frequency of the subcarrier index 0 is 500 Hz and the carrier frequency offset is 2 Hz, the actual frequency of the subcarrier index 0 then becomes 502 Hz. The DVB-T system can only obtain the carrier frequency offset through continuous calculations and to thus compensate the carrier frequency offset in order to maintain system stability.

According to characteristics of a DVB-T system, a CP signal is a time-invariant real number without an imaginary part, and the sign of all CP signals are identical. In contrast, other data signals are complex numbers having both a real part and an imaginary part. Further, the magnitude of CP signals is greater than that of other data signals. Therefore, through such characteristics of CP signals, the carrier frequency offsets can be easily estimated.

In an ISDB-T system, a design similar to CP signals is included. More specifically, in an ISDB system, a CP signal is replaced by a transmission and multiplexing configuration control (TMCC) signal or an auxiliary channel (AC) signal. That is, by replacing the CP signal in FIG. 1 with a TMCC signal or an AC signal, FIG. 1 may be regarded as a schematic diagram of an OFDM symbol in an ISDB-T system. In practice, subcarrier indices of the TMCC signal or the AC signal are also regulated by associated specifications.

Compared to CP signals, TMCC signals and AC signals are time-variant and information-carrying real numbers that appear at fixed frequencies. In other words, TMCC signals and AC signals do not have an imaginary part, and a symbol thereof has a positive or negative sign. Further, according to ISDB-T specifications, the magnitudes of TMCC signals and AC signals are greater than those of other data signals. It is apparent that, due to the time-variance of TMCC signals and AC signals, instead of directly estimating the carrier frequency offset, the system can only estimate the carrier frequency offset by involving additional calculations and adjustments.

Figure 2:
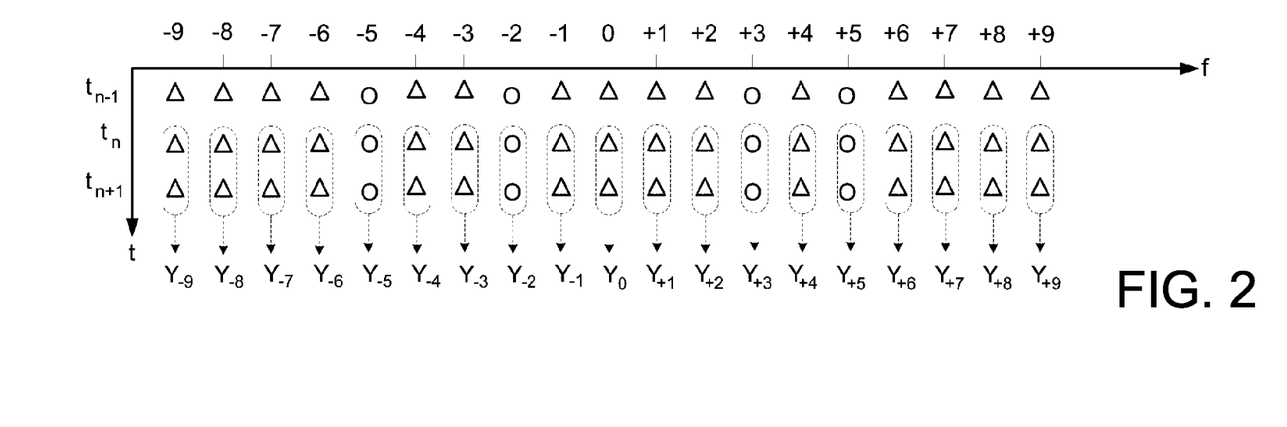
FIG. 2 is a schematic diagram of calculating a correlation between two consecutive symbols.

FIG. 2 shows a schematic diagram of calculating a correlation between two consecutive symbols, in a DVB-T system, for example. In FIG. 2, the correlation is calculated based on two symbols corresponding to the time point $t_n$ and the time point $t_{n+1}$ in each subcarrier. A person skilled in the art may also calculate the correlation by utilizing two other consecutive symbols, e.g., two symbols at the time point $t_{n-1}$ and the time point $t_n$.

The correlation of two symbols is calculated by conjugating the two symbols. Correlating complex numbers ($Y_{-0} \sim Y_9$) corresponding to 19 subcarrier indices are thus generated.

Wherein, $R_{n,k}$ and $R_{n+1,k}$ represent the magnitudes of output signals of $n^{th}$ and $(n+1)^{th}$ symbol at a $k^{th}$ subcarrier index.

$X_{n,k}$ and $X_{n+1,k}$ represent the magnitudes of data signals or CP signals of the $n^{th}$ and the $(n+1)^{th}$ symbols at the $k^{th}$ subcarrier index.

$H_{n,k}$ and $H_{n+1,k}$ represent the channel gains of the $n^{th}$ and the $(n+1)^{th}$ symbols at the $k^{th}$ subcarrier index.

(I) In a DVB-T system, when the carrier frequency offset is $\Delta f$ and the sampling frequency offset is not considered: $R_{n,k}=H_{n,k} \cdot X_{n,k} \cdot e^{j2\pi\Delta f n}$; $R^*_{n,k}=H_{n,k} \cdot X_{n,k} \cdot e^{-j2\pi\Delta f n}$; $R_{n+1,k}=H_{n+1,k} \cdot X_{n+1,k} \cdot e^{j2\pi\Delta f(n+1)}$. Therefore, while considering noise (N) and with the same channel gain, the correlating complex number of the two symbols at the $k^{th}$ subcarrier index is:

$$Y_k = R_{n+1,k} \cdot R^*_{n,k} = |H_{n,k}|^2 \cdot X_{n+1,k} \cdot X_{n,k} \cdot e^{j2\pi\Delta f} + N$$

In a DVB-T system, as CP signals are real numbers having the same sign and the same magnitude as well as appearing only at fixed frequencies (where k=−5, −2, +3 or +5), the correlating complex number of the subcarrier index corresponding to CP signals may be simplified as:

$$Y_k = R_{n+1,k} \cdot R^*_{n,k} = |H_{n,k}|^2 \cdot X_{n+1,k} \cdot X_{n,k} \cdot e^{j2\pi\Delta f} + N$$

Figure 3:
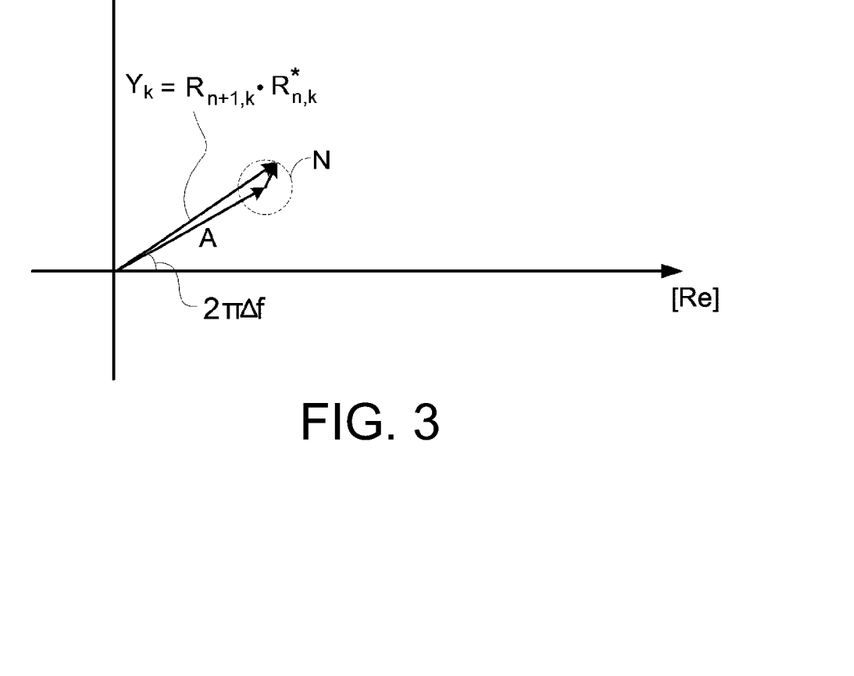
FIG. 3 is a schematic diagram of a correlating complex number of an arbitrary Continual Pilot (CP) signal.

In the above, A is a positive real number, and k=−5, −2, +3 or +5. FIG. 3 shows a schematic diagram of a correlating complex number of an arbitrary CP signal. It is apparent that an angle ($2\pi\Delta f$) of the correlating complex number is affected by the noise (N) and cannot be accurately determined.

Figure 4:
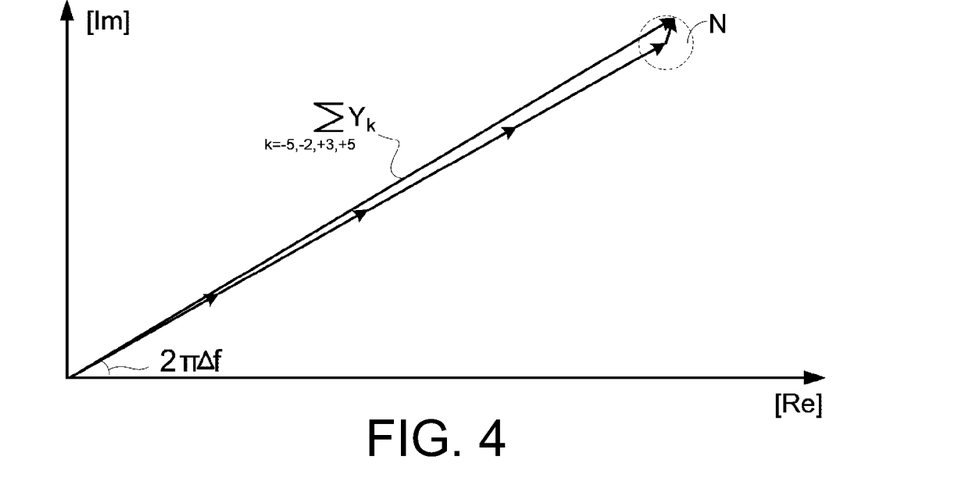
FIG. 4 is a schematic diagram of adding up correlating complex numbers of all CP signals.

According to an embodiment of the present invention, correlating complex numbers of all CP signals are added up for counteracting the noise and mitigating influences of the noise. FIG. 4 shows a schematic diagram of a sum of the correlating complex numbers of all the CP signals. It is apparent that the noise has a very small influence after adding up the correlating complex values of all the CP signals. Thus, the carrier frequency offset ($\Delta f$) can be estimated.

In other words, as equation (1) below, the carrier frequency offset ($\Delta f$) can be estimated by dividing the angle of a sum of the correlating complex numbers of all the CP signals by $2\pi$.

$$\Delta f = \frac{1}{2\pi} \arg \left[ \sum_{k=all-CP} Y_k \right] \qquad \text{equation (1)}$$

The above description is a method for estimating the carrier frequency offset for a DVB-T system, by use of equation (1). As described, the correlating complex numbers of all of the CP signals are added up to obtain the carrier frequency offset ($\Delta f$). For a person having ordinary skill in the art, it can be appreciated that, instead of adding up the correlating complex numbers of all the CP signals, the carrier frequency offset ($\Delta f$) can also be estimated given a sufficient number of correlating complex numbers of CP signals.

(II) In a DVB-T system, when the carrier frequency offset is $\Delta f$ and the sampling frequency offset is $\Delta T_s$: $R_{n,k}=H_{n,k} \cdot X_{n,k} \cdot e^{j2\pi(T_s \cdot k+\Delta f)n}$; $R^*_{n,k}=H_{n,k} \cdot X_{n,k} \cdot e^{-j2\pi(T_s \cdot k+\Delta f)n}$, $R_{n+1,k}=H_{n+1,k} \cdot X_{n+1,k} \cdot e^{j2\pi(T_s \cdot k+\Delta f)(n+1)}$. Therefore, by considering the noise (N) and with the same channel gain, the correlating complex number of the two symbols at the $k^{th}$ subcarrier index is:

$$Y_k = R_{n+1,k} \cdot R^*_{n,k} = |H_{n,k}|^2 \cdot X_{n+1,k} \cdot X_{n,k} \cdot e^{j2\pi(\Delta T_s \cdot k+\Delta f)} + N$$

In a DVB-T system, the number of CP signals at positive subcarrier indices is the same as the number of CP signals at negative subcarrier indices. Thus, when estimating the carrier frequency offset ($\Delta f$), the correlating complex numbers of all the CP signals are added up, so that the factor of the sampling frequency offset ($\Delta T_E$) can almost be counteracted. Therefore, details for estimating the carrier frequency offset ($\Delta f$) are the same as equation (1), and shall be omitted herein.

According to an embodiment of the present invention, to estimate the carrier frequency offset ($\Delta f$), the sum of the correlating complex numbers of the CP signals at negative subcarrier indices is subtracted from the sum of the correlating complex numbers of the CP signals at positive subcarrier indices. As such, the influences of the carrier frequency offset ($\Delta f$) can be counteracted, and the calculated result can be utilized for estimating the sampling frequency offset (ΔT$_s$). That is:

$$\Delta T_s = \frac{1}{2\pi}\left\{\arg\left[\sum_{k=positive-CP} Y_k\right] - \arg\left[\sum_{k=negative-CP} Y_k\right]\right\} \quad \text{equation (2)}$$

The above description is a method for estimating the sampling frequency offset for a DVB-T system, by use of equation (2). Similarly, for a person having ordinary skill in the art, it can be appreciated that, the sampling frequency offset (ΔT$_s$) can also be estimated given a sufficient number of correlating complex numbers of CP signals in positive and a sufficient number of correlating complex numbers of CP signals in negative.

In an ISDB-T system, the carrier frequency offset (Δf) and the sampling frequency offset (ΔT$_s$) cannot be estimated through equations (1) and (2). As previously stated, TMCC signals and AC signals are in equivalence to CP signals in an ISDB-T system. Therefore, in an ISDB-T system, the carrier frequency offset (Δf) and the sampling frequency offset (ΔT$_s$) are estimated based on TMCC signals and AC signals.

Compared to CP signals, TMCC signals and AC signals are time-variant and information-carrying real numbers appearing at fixed frequencies. In other words, TMCC signals and AC signals are either positive or negative real numbers. Further, according to ISDB-T specifications, the magnitudes of TMCC signals and AC signals are larger than those of other data signals.

The present invention is applied in an ISDB-T system to also calculate the correlation between two sampling points corresponding to two symbols at the time point t$_n$ and the time point t$_{n+1}$ for each subcarrier. A person skilled in the art may also calculate the correlation by utilizing two other consecutive symbols, e.g., the symbols at the time point t$_{n-1}$ and the time point t$_n$.

Correlating complex numbers corresponding to all subcarriers are generated by calculating the correlation between the two symbols.

Wherein, R$_{n,k}$ and R$_{n+1,k}$ represent the magnitudes of output signals of n$^{th}$ and (n+1)$^{th}$ symbols of a k$^{th}$ subcarrier index.

X$_{n,k}$ and X$_{n+1,k}$ represent the magnitudes of data signals, TMCC signals or AC signals of the n$^{th}$ and the (n+1)$^{th}$ symbols at the k$^{th}$ subcarrier index.

H$_{n,k}$ and H$_{n+1,k}$ represent the channel gains of the n$^{th}$ and the (n+1)$^{th}$ symbols at the k$^{th}$ subcarrier index.

(III) In an ISDB-T system, when the carrier frequency offset is Δf and the sampling frequency offset is not considered: $R_{n,k}=H_{n,k}\cdot X_{n,k}\cdot e^{j2\pi\Delta fn}$; $R^*_{n,k}=H_{n,k}\cdot X_{n,k}\cdot e^{-j2\pi\Delta fn}$; $R_{n+1,k}=H_{n+1,k}\cdot X_{n+1,k}\cdot e^{j2\pi\Delta f(n+1)}$. Therefore, by considering a noise (N) and with the same channel gain, the correlating complex number of the two symbols at the k$^{th}$ subcarrier index is:

$$Y_k = R_{n+1,k}\cdot R^*_{n,k} = |H_{n,k}|^2\cdot X_{n+1,k}\cdot X_{n,k}\cdot e^{j2\pi\Delta f}+N$$

Since the TMCC signal or the AC signal is unknown, the correlating complex number of the subcarrier index corresponding to the TMCC signal and the AC signal may be either of the two situations below:

$$Y_k = |H_{n,k}|^2\cdot |X_{n,k}|^2\cdot e^{j2\pi\Delta f}+N = B\cdot e^{j2\pi\Delta f}+N; \text{ or}$$

$$Y_k = -|H_{n,k}|^2\cdot |X_{n,k}|^2\cdot e^{j2\pi\Delta f}+N = -B\cdot e^{j2\pi\Delta f}+N$$

In the above, B is a positive real number, and k is the subcarrier index for the TMCC signal or the AC signal.

Due to the two possible conditions of the correlating complex number in an ISDB-T system, the approach of directly adding up the correlating complex numbers of the TMCC signals and the AC signals and thus estimating the carrier frequency offset as in a DVB-T system is infeasible. According to an embodiment of the present invention, the correlating complex number of the subcarrier is first squared to ensure the result being a positive value. That is:

$$Y_k^2 = |H_{n,k}|^4\cdot |X_{n,k}|^4\cdot e^{j4\pi\Delta f}+n = B^2\cdot e^{j4\pi\Delta f}+n, \text{ where n is the noise.}$$

The squares of the correlating complex numbers of all the TMCC signals and AC signals are added up, and the carrier frequency offset (Δf) is estimated accordingly. That is:

$$\Delta f = \frac{1}{4\pi}\arg\left[\sum_{k=all-TMCC\&AC} Y_k^2\right] = \quad \text{equation (3)}$$

Figure 5:
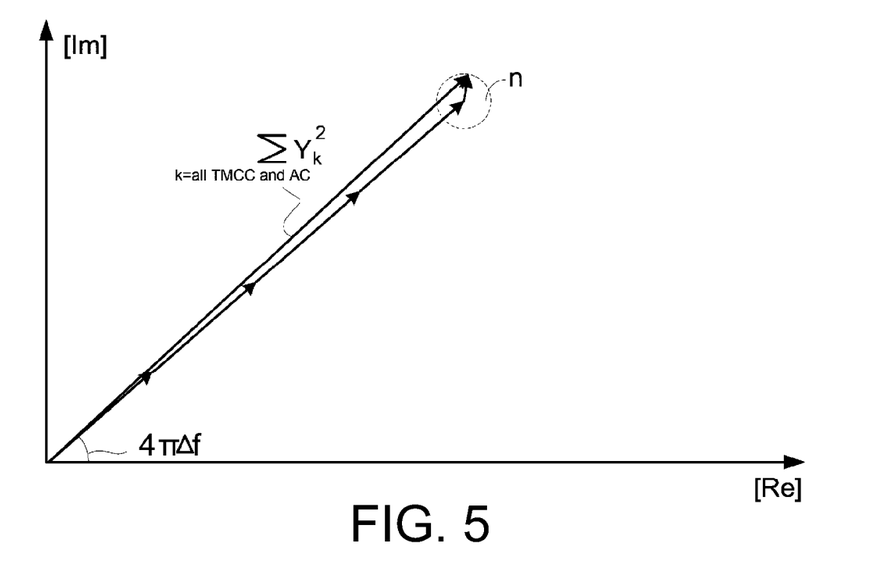
FIG. 5 is a schematic diagram of adding up squares of correlating complex numbers of all TMCC signals and AC signals.

That is, in an ISDB-T system, after squaring the correlating complex numbers of all the TMCC signals and AC signals, it is ensured that the real part is a positive value. The squares are added up to counteract the noise and to mitigate influences of the noise. FIG. 5 shows a schematic diagram of the sum of the squares of the correlating complex numbers of all the TMCC signals and AC signals. It is apparent that, after adding up the squares of the correlating complex numbers of all the TMCC signals and AC signals, the noise has a very small influence, and so the carrier frequency offset (Δf) can be estimated.

In other words, as in equation (3), the carrier frequency offset (Δf) can be estimated by dividing an angle of a sum of the squares of the correlating complex numbers of all the TMCC signals and AC signals by 4π.

The above description is a method for estimating the carrier frequency offset for an ISDB-T system, by use of equation (3). As described, the correlating complex numbers of all of the CP signals are squared, and the squares are added up to obtain the carrier frequency offset (Δf). For a person having ordinary skill in the art, it can be appreciated that, instead of adding up the sum of the squares of the correlating complex numbers of all the TMCC signals and AC signals, the carrier frequency offset (Δf) can also be estimated given a sufficient number of correlating complex numbers of TMCC signals and AC signals.

It should be noted that, the method for estimating the carrier frequency offset in an ISDB-T system is applicable to a DVB-T system to estimate the carrier frequency offset of the DVB-T system.

(IV) In an ISDB-T system, considering both the carrier frequency offset (Δf) and the sampling frequency offset (ΔT$_s$): $R_{n,k}=H_{n,k}\cdot X_{n,k}\cdot e^{j2\pi(T_s\cdot k+\Delta f)n}$; $R^*_{n,k}=H_{n,k}\cdot X_{n,k}\cdot e^{-j2\pi(T_s\cdot k+\Delta f)n}$, $R_{n+1,k}=H_{n+1,k}\cdot X_{n+1,k}\cdot e^{j2\pi(T_s\cdot k+\Delta f)(n+1)}$. Therefore, by considering the noise (N) and with the same channel gain, the correlating complex number of the two symbols at the k$^{th}$ subcarrier index is:

$$Y_k = R_{n+1,k}\cdot R^*_{n,k} = |H_{n,k}|^2\cdot X_{n+1,k}\cdot X_{n,k}\cdot e^{j2\pi(\Delta T_s\cdot k+\Delta f)}+N$$

The square of the correlating complex number is:

$$Y_k^2 = |H_{n,k}|^4\cdot |X_{n,k}|^4\cdot e^{j4\pi(\Delta T_s\cdot k+\Delta f)}+n = B^2\cdot e^{j4\pi(\Delta T_s\cdot k+\Delta f)}+n$$

In an ISDB-T system, the number of TMCC signals and AC signals at subcarrier indices in positive is the same as the number of the TMCC signals and AC signals at subcarrier indices in negative. Therefore, by adding up the squares of the correlating complex numbers of the all the TMCC signals and AC signals, the factor of the sampling frequency offset (ΔT$_s$)

can almost be counteracted. Therefore, details for estimating the carrier frequency offset (Δf) are the same as equation (3), and shall be omitted herein.

According to an embodiment of the present invention, to estimate the carrier frequency offset (Δf), the sum of the correlating complex numbers of the TMCC signals and AC signals at negative subcarrier indices is subtracted from the sum of the correlating complex numbers of the TMCC signals and AC signals at positive subcarrier indices. As such, the influence of the carrier frequency offset (Δf) can be counteracted, and the calculated result can be utilized for estimating the sampling frequency offset ($\Delta T_s$). That is:

$$\Delta T_s = \frac{1}{4\pi}\left\{\arg\left[\sum_{k=positive-TMCC\&AC} Y_k^2\right] - \arg\left[\sum_{k=negative-TMCC\&AP} Y_k^2\right]\right\} \quad \text{equation (4)}$$

The above description is a method for estimating the sampling frequency offset for an ISDB-T system, by use of equation (4). Similarly, for a person having ordinary skill in the art, it can be appreciated that, the sampling frequency offset ($\Delta T_s$) can also be estimated given a sufficient number of correlating complex numbers of TMCC signals and AC signals.

It should be noted that, the above method for estimating the sampling frequency offset for an ISDB-T system is also applicable to a DVB-T system to estimate the carrier frequency offset in the DVB-T system.

Figure 6:
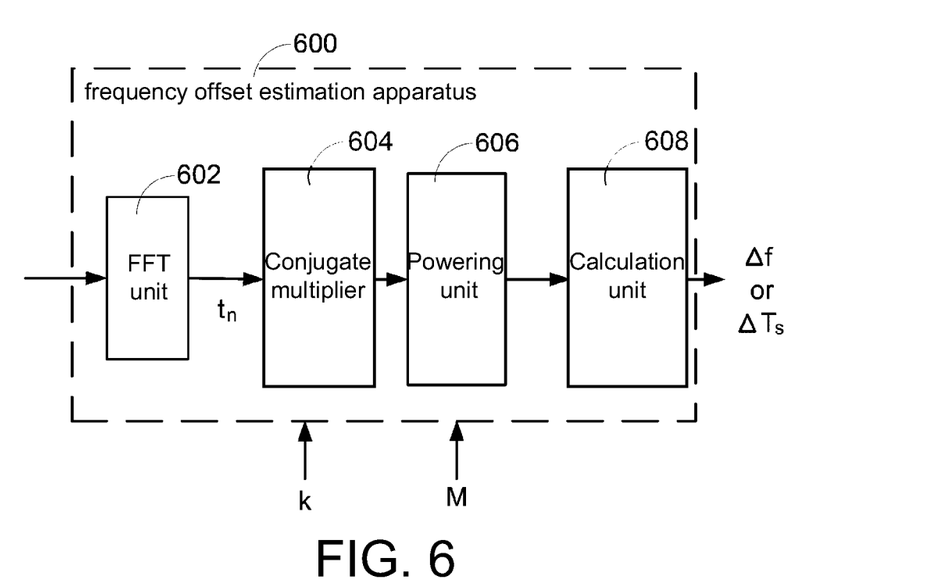
FIG. 6 is a block diagram of a carrier frequency offset and sampling frequency offset estimation apparatus for a multi-carrier communication system according to an embodiment of the present invention.

FIG. 6 shows a block diagram of a carrier frequency offset and sampling frequency offset estimation apparatus for a multi-carrier communication system according to an embodiment of the present invention. The estimation apparatus 600 includes an FFT unit 602, a conjugate multiplier 604, a powering unit 606 and a calculation unit 608.

The FFT unit 602 performs an FFT operation on a baseband signal to transform the baseband signal from a time domain to a frequency domain, and generates multiple symbols ($t_n$) to the conjugate multiplier 604.

The conjugate multiplier 604 calculates a correlating complex number for two sampling points of every two consecutive symbols with respect to a predetermined subcarrier index (k). For example, in a DVB-T system, the conjugate multiplier 604 performs a conjugate multiplication operation on the subcarrier indices (k) of all CP signals to generate correlating complex numbers of all the CP signals. Alternatively, in an ISDB-T system, the conjugate multiplier 604 performs conjugate multiplication on the subcarrier indices (k) of all TMCC signals or AC signals to generate correlating complex numbers of all the TMCC signals or AC signals.

The powering unit 606 receives the correlating complex number of the predetermined subcarrier index, and applies an exponent to the correlating complex number of the predetermined subcarrier index according to a power (M). For example, in an ISDB-T or DVB-T system, a power (M) of 2 is entered, and the powering unit 606 raises the received correlating complex number by a power of 2. Similarly, in a DVB-T system, the powering unit 606 may also receive a power (M) of 1, and raises the correlating complex number of the CP signal by a power of 1.

The calculation unit 608 calculates the carrier frequency offset (Δf) or the sampling frequency offset ($\Delta T_s$). That is, in an ISDB-T or DVB-T system and with a power (M) of 2 entered, the calculation 608 calculates the carrier frequency offset (Δf) or the sampling frequency offset ($\Delta T_s$) according to equations (3) and (4). Alternatively, in a DVB-T system and with a power (M) of 1, the calculation unit 608 calculates the carrier frequency offset (Δf) or the sampling frequency offset ($\Delta T_s$) according to equations (1) and (2).

Figure 7:
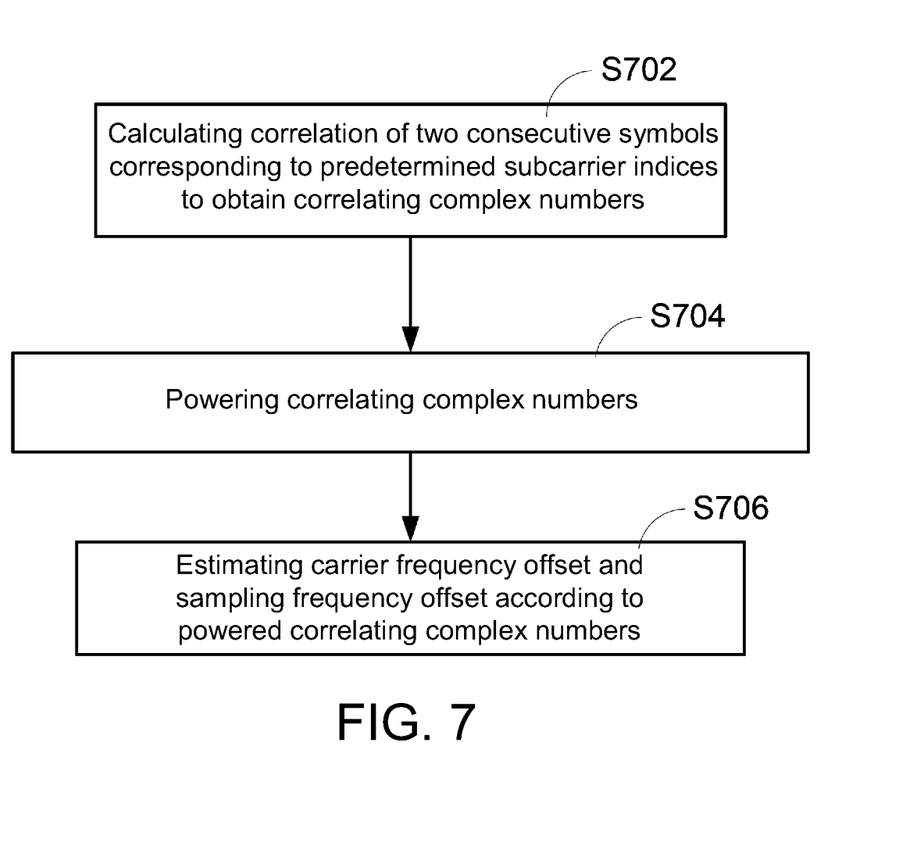
FIG. 7 is a flowchart of a carrier frequency offset and sampling frequency offset estimation method for a multi-carrier communication system according to an embodiment of the present invention

FIG. 7 shows a flowchart of a carrier frequency offset and sampling frequency offset estimation method for a multi-carrier communication system according to an embodiment of the present invention.

In step S702, a correlating complex number of two consecutive symbols at a predetermined subcarrier index is calculated. In step S704, the correlating complex number corresponding to the predetermined subcarrier index is powered according to the power. In step 706, the carrier frequency offset (Δf) or the sampling frequency offset ($\Delta T_s$) are estimated according to a powered result in step S704.

For example, in a DVB-T system, the conjugate multiplier 604 receives the subcarrier indices (k) of all the CP signals, and performs conjugate multiplication to generate the correlating complex numbers of all the CP signals. When the power (M) is 1, the carrier frequency offset (Δf) or the sampling frequency offset ($\Delta T_s$) can be estimated according to equations (1) and (2).

Alternatively, in an ISDB-T system, the conjugate multiplier 604 receives the subcarrier indices (k) of all the TMCC signals and AC signals, and performs a conjugate multiplication to generate the correlating complex numbers of all the TMCC signals and AC signals. When the power (M) is 2, the correlating complex numbers are squared. Then, the carrier frequency offset (Δf) or the sampling frequency offset ($\Delta T_s$) can be estimated according to equations (3) and (4). Such method is also applicable to a DVB-T system to estimate the carrier frequency offset (Δf) or the sampling frequency offset ($\Delta T_s$) in the DVB-T system.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A frequency offset estimation apparatus for a multi-carrier communication system, comprising:
    a fast Fourier transform (FFT) unit, configured to transform a reception signal from a time domain to a frequency domain, and to generate a plurality of samples corresponding to a plurality of symbols;
    a conjugate multiplier, configured to generate a plurality of correlating complex numbers by conjugate multiplying the samples corresponding to two consecutive symbols, wherein said consecutive symbols are corresponding to a plurality of predetermined subcarrier indices;
    a powering unit, configured to receive an exponent, raise the correlating complex numbers to a power of said exponent, and to generate a plurality of powered correlating complex numbers; and
    a calculation unit, configured to receive the powered correlating complex numbers and to estimate a frequency offset accordingly, wherein the frequency offset comprises at least one of a carrier frequency offset (CFO) and a sampling frequency offset (SFO).

2. The frequency offset estimation apparatus according to claim 1, wherein the frequency offset estimation apparatus is applied to a Digital Video Broadcasting Terrestrial (DVB-T) system, and the predetermined subcarrier indices correspond to a plurality of continual pilot (CP) signals.

3. The frequency offset estimation apparatus according to claim 2, wherein the powering unit further receives a power of 1 for powering the correlating complex numbers, and the calculation unit obtains an angle for estimating the carrier frequency offset according to a sum of the powered correlating complex numbers.

4. The frequency offset estimation apparatus according to claim 2, wherein the powering unit further receives a power of 1 for powering the correlating complex numbers; the predetermined subcarrier indices comprise first-part positive subcarrier indices and second-part negative subcarrier indices; the calculation unit obtains a first angle by adding the powered correlating complex numbers corresponding to the first-part positive subcarrier indices, obtains a second angle by adding the powered correlating complex numbers corresponding to the second-part negative subcarrier indices, and estimates the sampling frequency offset according to a difference between the second angle from the first angle.

5. The frequency offset estimation apparatus according to claim 2, wherein the powering unit further receives a power of 2 for powering the correlating complex numbers, and the calculation unit estimates the carrier frequency offsets according to an angle obtained by adding the powered correlating complex numbers.

6. The frequency offset estimation apparatus according to claim 2, wherein the powering unit further receives a power of 2 for powering the correlating complex numbers; the predetermined subcarrier indices comprise first-part positive subcarrier indices and second-part negative subcarrier indices; the calculation unit obtains a first angle by adding up the powered correlating complex numbers corresponding to the first-part positive subcarrier indices, obtains a second angle by adding up the powered correlating complex numbers corresponding to the second-part negative subcarrier indices, and estimates the sampling frequency offset according to a difference between the second angle and the first angle.

7. The frequency offset estimation apparatus according to claim 1, wherein the frequency offset estimation apparatus is applied to an Integrated Services Digital Broadcasting (ISDB-T) system, and the predetermined subcarrier indices correspond to a plurality of Transmission and Multiplexing Configuration Control (TMCC) and Auxiliary Channel (AC) signals.

8. The frequency offset estimation apparatus according to claim 7, wherein the powering unit further receives a power of 2 for powering the correlating complex numbers, and the calculation unit estimates the carrier frequency offsets according to an angle obtained by adding the powered correlating complex numbers.

9. The frequency offset estimation apparatus according to claim 7, wherein the powering unit further receives a power of 2 for powering the correlating complex numbers; the predetermined subcarrier indices comprise first-part positive subcarrier indices and second-part negative subcarrier indices; the calculation unit obtains a first angle by adding up the powered correlating complex numbers corresponding to the first-part positive subcarrier indices, obtains a second angle by adding up the powered correlating complex numbers corresponding to the second-part negative subcarrier indices, and estimates the sampling frequency offset according to difference between the second angle and the first angle.

10. A frequency offset estimation method for a multi-carrier communication system, comprising:
calculating a plurality of correlating complex numbers corresponding to two consecutive symbols, wherein said consecutive symbols are corresponding to a plurality of predetermined subcarrier indices;
generating a plurality of powered correlating complex numbers by raising the correlating complex numbers to a power of an exponent; and
estimating a frequency offset according to the powered correlating complex numbers, wherein the frequency offset comprises at least one of a carrier frequency offset (CFO) and a sampling frequency offset (SFO).

11. The frequency offset estimation method according to claim 10, wherein the frequency offset estimation method is applied to a DVB-T system, and the predetermined subcarrier indices correspond to a plurality of continual pilot (CP) signals.

12. The frequency offset estimation method according to claim 11, wherein the power is 1, and the step of estimating the carrier frequency offset further comprises:
obtaining an angle by adding the powered correlating complex numbers; and
estimating the carrier frequency offset according to the angle.

13. The frequency offset estimation method according to claim 11, wherein the power is 1; the predetermined subcarrier indices comprise first-part positive subcarrier indices and second-part negative subcarrier indices; and the step of estimating the sampling frequency offset further comprises:
obtaining a first angle by adding the powered correlating complex numbers corresponding to the first-part positive subcarrier indices;
obtaining a second angle by adding the powered correlating complex numbers corresponding to the second-part negative subcarrier indices; and
estimating the sampling frequency offset according to a difference between the second angle and the first angle.

14. The frequency offset estimation method according to claim 11, wherein the power is 2, and the step of estimating the carrier frequency offset further comprises:
obtaining an angle by adding the powered correlating complex numbers, and estimating the carrier frequency offset according to the angle.

15. The frequency offset estimation method according to claim 11, wherein the power is 2; the predetermined subcarrier indices comprise first-part positive subcarrier indices and second-part negative subcarrier indices; and the step of estimating the sampling frequency offset further comprises:
obtaining a first angle by adding the powered correlating complex numbers corresponding to the first-part positive subcarrier indices;
obtaining a second angle by adding the powered correlating complex numbers corresponding to the second-part negative subcarrier indices; and
estimating the sampling frequency offset according to the difference between the second angle and the first angle.

16. The frequency offset estimation method according to claim 10, wherein the frequency offset estimation method is applied to an ISDB-T system, and the predetermined subcarrier indices correspond to a plurality of TMCC and AC signals.

17. The frequency offset estimation method according to claim 16, wherein the power is 2, and the step of estimating the carrier frequency offset further comprises:
obtaining an angle by adding up the powered correlating complex numbers, and estimating the carrier frequency offset according to the angle.

18. The frequency offset estimation method according to claim 16, wherein the power is 2; the predetermined subcarrier indices comprise first-part positive subcarrier indices and second-part negative subcarrier indices; and the step of estimating the sampling frequency offset further comprises:

obtaining a first angle by adding the powered correlating complex numbers corresponding to the first-part positive subcarrier indices;

obtaining a second angle by adding the powered correlating complex numbers corresponding to the second-part negative subcarrier indices; and estimating the sampling frequency offset according to a difference between the second angle and the first angle.

* * * * *